United States Patent
Herre et al.

(10) Patent No.: US 10,668,491 B2
(45) Date of Patent: Jun. 2, 2020

(54) COATING AGENT VALVE

(71) Applicant: Dürr Systems AG, Bietigheim-Bissingen (DE)

(72) Inventors: Frank Herre, Oberriexingen (DE); Manfred Michelfelder, Höpfigheim/Steinheim (DE); Michael Baumann, Flein (DE); Sascha Hermann, Korb (DE); Bernhard Seiz, Lauffen (DE); Thomas Buck, Sachsenheim (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 22 days.

(21) Appl. No.: 15/738,585

(22) PCT Filed: Jul. 1, 2016

(86) PCT No.: PCT/EP2016/001127
§ 371 (c)(1),
(2) Date: Dec. 21, 2017

(87) PCT Pub. No.: WO2017/005354
PCT Pub. Date: Jan. 12, 2017

(65) Prior Publication Data
US 2018/0169673 A1  Jun. 21, 2018

(30) Foreign Application Priority Data

Jul. 3, 2015 (DE) .......................... 10 2015 008 659

(51) Int. Cl.
*F16K 31/122* (2006.01)
*F16K 1/38* (2006.01)
(Continued)

(52) U.S. Cl.
CPC .......... *B05B 1/3006* (2013.01); *B01F 5/0615* (2013.01); *B01F 5/0619* (2013.01);
(Continued)

(58) Field of Classification Search
CPC ............................. F16K 1/38; F16K 31/1221
See application file for complete search history.

(56) References Cited

U.S. PATENT DOCUMENTS 2,384,679 A * 9/1945 Holtzclaw ............. B05B 7/1254
239/118
3,463,363 A    8/1969 Zelna
(Continued)

FOREIGN PATENT DOCUMENTS

DE    3834674 A1    4/1990
DE    19846073 A1    4/2000
(Continued)

OTHER PUBLICATIONS

International Search Report and Written Opinion for PCT/EP2016/001127 (10 pages; with English translation).
(Continued)

*Primary Examiner* — Umashankar Venkatesan
(74) *Attorney, Agent, or Firm* — Bejin Bieneman PLC

(57) ABSTRACT

The disclosure relates to a coating agent valve (1) for controlling a flow of fluid of a coating agent mixture consisting of two coating agent components (H, SL), in particular a two-component paint consisting of a master batch (SL) and a hardener (H). The coating agent valve according to the disclosure (1) comprises a valve seat, a displaceable valve head (12), a valve drive (15) for displacing the valve head (12) and a displaceable valve needle (14, 20) which connects the valve drive (15) to the valve head (12) and moves the valve head (12) in correspondence with the valve drive (15). The disclosure provides for an auto-
(Continued)

matic reduction in pressure in order to avoid excess-pressure damage upstream from the coating agent valve (1).

40 Claims, 5 Drawing Sheets

(51) Int. Cl.
| | |
|---|---|
| *B05B 1/30* | (2006.01) |
| *B01F 5/06* | (2006.01) |
| *B05B 7/04* | (2006.01) |
| *B05B 7/12* | (2006.01) |
| *B05B 12/08* | (2006.01) |
| B05B 7/24 | (2006.01) |
| B05B 15/525 | (2018.01) |

(52) U.S. Cl.
CPC ............ *B05B 1/306* (2013.01); *B05B 7/0408* (2013.01); *B05B 7/1254* (2013.01); *B05B 7/1263* (2013.01); *B05B 12/087* (2013.01); *F16K 1/38* (2013.01); *F16K 31/1221* (2013.01); *B05B 7/2497* (2013.01); *B05B 15/525* (2018.02)

(56) References Cited

U.S. PATENT DOCUMENTS

| | | | |
|---|---|---|---|
| 3,589,612 A | 6/1971 | Shaffer | |
| 3,814,328 A | 6/1974 | Warning | |
| 3,923,252 A | 12/1975 | Warning, Sr. | |
| 4,228,958 A * | 10/1980 | Perry | B05B 7/0815 |
| | | | 137/114 |
| 4,667,878 A | 5/1987 | Behr | |
| 5,462,204 A | 10/1995 | Finn | |
| 5,705,548 A | 1/1998 | Matsuoka | |
| 6,056,270 A * | 5/2000 | Zimmerly | F16K 1/38 |
| | | | 137/15.18 |
| 6,131,823 A * | 10/2000 | Langeman | B05B 7/0408 |
| | | | 239/291 |
| 6,267,302 B1 | 7/2001 | Huffman | |
| 6,284,047 B1 | 9/2001 | Yoshida et al. | |
| 6,378,783 B1 | 4/2002 | Ballu | |
| 6,752,376 B1 * | 6/2004 | Satou | F16K 7/123 |
| | | | 251/331 |
| 7,275,702 B2 | 10/2007 | Nolte | |
| 9,061,310 B2 | 6/2015 | Seiz | |
| 9,126,217 B2 | 9/2015 | Nolte et al. | |
| 9,539,594 B2 | 1/2017 | Seiz | |
| 2002/0036017 A1 | 3/2002 | Leys et al. | |
| 2002/0195505 A1* | 12/2002 | Haruch | B05B 1/306 |
| | | | 239/526 |
| 2003/0136862 A1* | 7/2003 | Filicicchia | B05B 7/0884 |
| | | | 239/428 |
| 2005/0029370 A1 | 2/2005 | Giulano | |
| 2005/0035220 A1 | 2/2005 | Brown | |
| 2005/0224513 A1* | 10/2005 | Strong | B05B 1/306 |
| | | | 222/1 |
| 2006/0038154 A1 | 2/2006 | Fukano et al. | |
| 2010/0308134 A1* | 12/2010 | Bunnell | B05B 7/0408 |
| | | | 239/398 |
| 2011/0076411 A1 | 3/2011 | Nussbaum | |
| 2011/0079618 A1* | 4/2011 | Chastine | B05C 5/0237 |
| | | | 222/542 |
| 2012/0114849 A1 | 5/2012 | Melcher et al. | |
| 2013/0284285 A1 | 10/2013 | Reifenberger | |
| 2014/0117045 A1 | 5/2014 | Varga | |
| 2017/0291182 A1* | 10/2017 | Yoon | B05B 7/12 |
| 2018/0043381 A1* | 2/2018 | Orla-Jensen | B05B 1/3013 |

FOREIGN PATENT DOCUMENTS

| | | |
|---|---|---|
| DE | 10014133 A1 | 11/2000 |
| DE | 101 19 520 A1 | 10/2002 |
| DE | 10115472 A1 | 10/2002 |
| DE | 10212601 A1 | 10/2003 |
| DE | 69827611 T2 | 11/2005 |
| DE | 10 2005 033 191 A1 | 2/2006 |
| DE | 102006048037 A1 | 4/2008 |
| DE | 20 2008 017 338 U1 | 5/2009 |
| DE | 102009020064 A1 | 11/2010 |
| DE | 102009037604 A1 | 2/2011 |
| DE | 10 2010 011 064 A1 | 9/2011 |
| DE | 102010019771 A1 | 11/2011 |
| DE | 10 2014 012 705 A1 | 3/2016 |
| EP | 0108929 A2 | 5/1984 |
| EP | 1063018 A1 | 12/2000 |
| EP | 1250964 A2 | 10/2002 |
| EP | 1 502 659 A1 | 2/2005 |
| GB | 2373564 A | 9/2002 |
| JP | S59-98757 U | 7/1984 |
| JP | H09511680 A | 11/1997 |
| JP | 2001276687 A | 10/2001 |
| JP | 2007275753 A | 10/2007 |
| JP | 4459500 B2 | 4/2010 |
| WO | 2009019036 A1 | 2/2009 |
| WO | 2014066005 A1 | 5/2014 |

OTHER PUBLICATIONS

International Search Report and Written Opinion for PCT/EP2016/000698 dated Aug. 8, 2016 (13 pages; with English translation).

Non-Final Office Action for U.S. Appl. No. 15/738,586 dated Jul. 5, 2019 (9 pages).

Japanese Office Action for JP Patent Application No. 2018-500328 dated Nov. 25, 2019 (9 pages; with English translation).

* cited by examiner

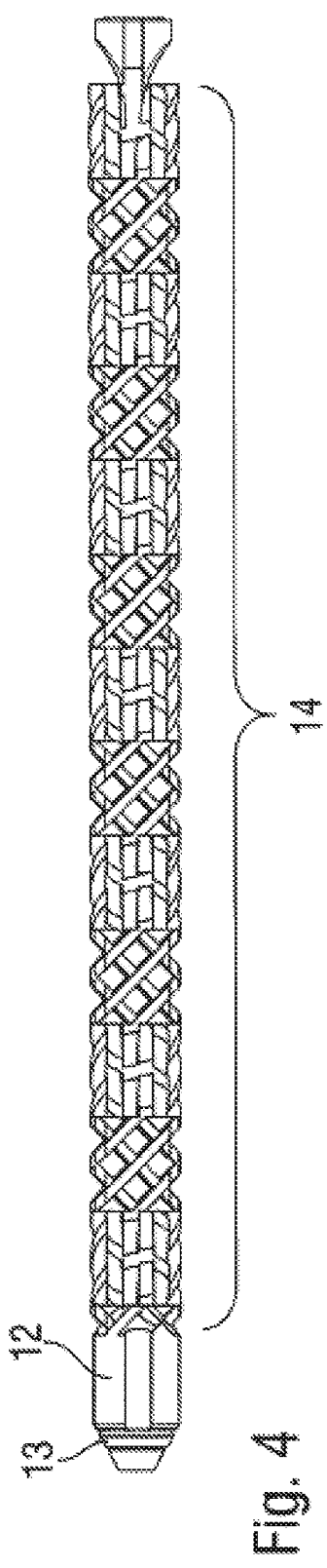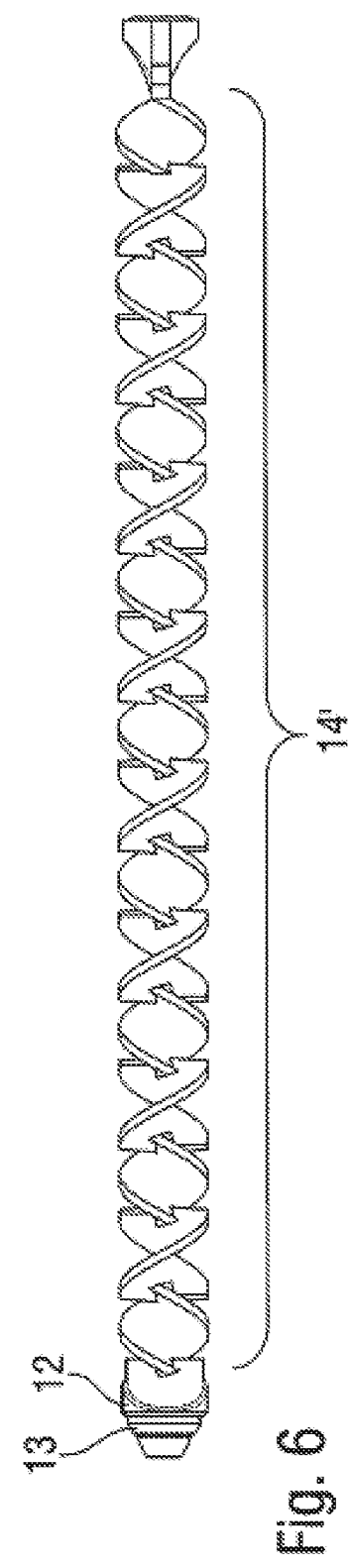

COATING AGENT VALVE

CROSS-REFERENCE TO RELATED APPLICATIONS

This application is a national stage of, and claims priority to, Patent Cooperation Treaty Application No. PCT/EP2016/001127, filed on Jul. 1, 2016, which application claims priority to German Application No. DE 10 2015 008 659.6, filed on Jul. 3, 2015, which applications are hereby incorporated herein by reference in their entireties.

The disclosure relates to a coating agent valve for controlling a flow of fluid of a coating agent mixture consisting of two coating agent components, in particular a two-component paint consisting of a master batch and a hardener.

BACKGROUND

A rotary atomiser which is suitable for the application of a two-component paint is known from DE 10 2010 019 771 A1. The two paint components (master batch and hardener) in this case are supplied to the rotary atomiser via separate lines and are mixed in the atomiser by a lattice mixer. The dispensing of the paint is controlled in this known rotary atomiser by a main needle valve which is arranged in the rotary atomiser downstream from the lattice mixer and as a rule is driven pneumatically. The lattice mixer and the main needle valve in this case are located in a hollow paint tube which is passed through the hollow turbine shaft of the drive turbine in the rotary atomiser. In this case, the needles for the main needle valve and the lattice mixer require spatially separate ducts in the paint tube, resulting in a space problem. It is however problematic to enlarge the internal cross-section of the paint tube, since then the hollow turbine shaft of the drive turbine of the rotary atomiser would have to have a larger internal cross-section as well. This in turn would result in an increase in size of the moving masses, so that the mounting of the turbine shaft and the drive turbine itself would both have to be made larger. This would in turn result in higher capital investment costs and also greater air consumption. Furthermore, the rotary atomiser would then be larger and heavier.

What is disadvantageous about this known rotary atomiser is the fact that if the main needle valve is closed or seizes damage upstream from the rotary atomiser may occur due to excess pressure.

A similar rotary atomiser is known from DE 102 12 601 A1. In this case, the main needle valve is driven by a membrane which is acted upon by compressed air. In this case too, however, if the main needle valve is closed or seizes, damage upstream from the rotary atomiser may occur due to excess pressure.

Further, with regard to the prior art, reference should be made to U.S. Pat. No. 4,667,878, DE 101 15 472 A1, US 2005/0035220 A1 and DE 198 46 073 A1.

BRIEF DESCRIPTION OF DRAWINGS

FIG. 4 is a side view of a lattice mixer, which at the same time forms a valve needle, FIG. 6 is a modification of FIG. 4 in the form of a spiral mixer.

DETAILED DESCRIPTION

Figure 1:
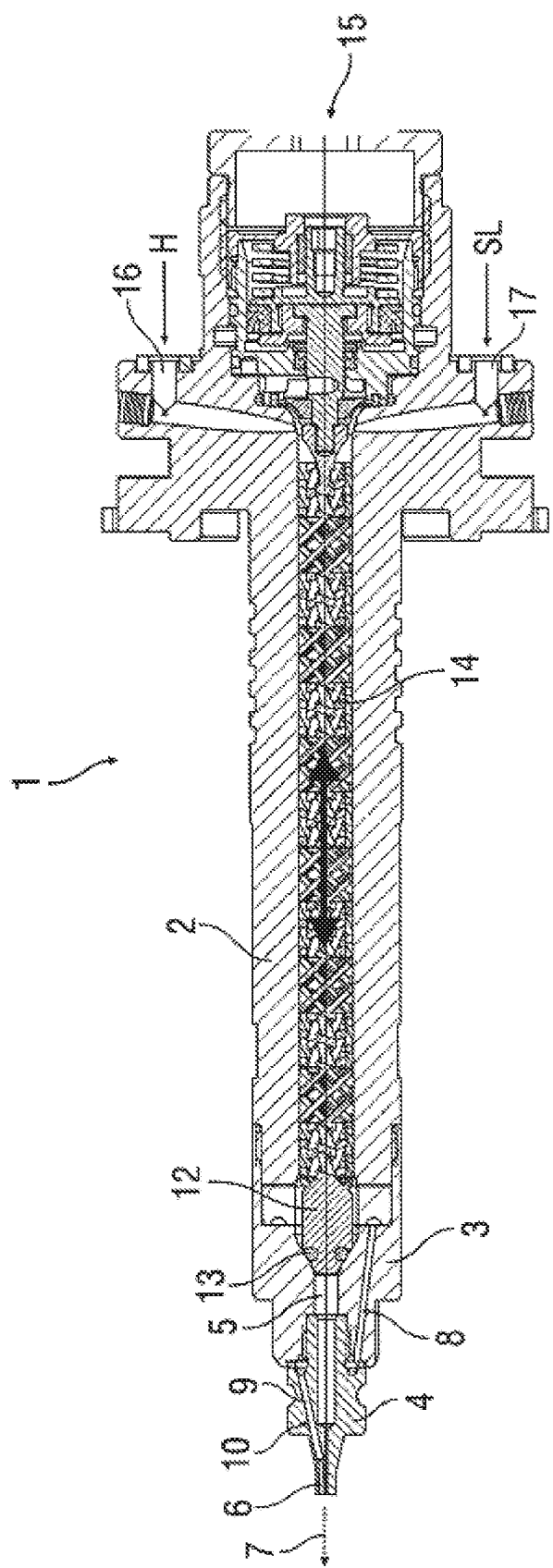
FIG. 1 is a longitudinal sectional view through a mixer arrangement according to the disclosure, which combines the function of a mixer and the function of a main needle valve.

The coating agent valve according to the disclosure has an automatic reduction in pressure if the input-side coating agent pressure becomes too great. This prevents damage or operational malfunctions from occurring upstream from the coating agent valve according to the disclosure due to excess pressure. This reduction in pressure is achieved in that the coating agent pressure in the valve space downstream from the membrane acts on the membrane and hence also on the valve needle, as a result of which the valve needle is pressed in the direction of the open position. Upon a certain opening pressure being exceeded, the coating agent pressure applied on the input side then opens the coating agent valve in order to avoid damage due to a pressure overload.

The disclosure also includes the general technical concept of integrating the technical functions of the valve needle and the mixer in a single component. Thus the valve needle has the technical function of transmitting the drive movement of the valve drive (e.g. pneumatic piston) to the valve head, so that the coating agent valve closes or opens. The function of the mixer, on the other hand, is to mix the two coating agent components (e.g. master batch, hardener) together. The disclosure now provides for the lattice mixer additionally to take on the technical function of the valve needle and thus to be arranged displaceably, so that the displaceable mixer can move the valve head in correspondence with the valve drive. With the solution according to the disclosure, the mixer (e.g. lattice mixer, spiral mixer) is therefore moved in the paint tube like a valve needle in order to move the valve head either into a closed position or into an open position.

The coating agent valve according to the disclosure therefore first of all, in keeping with the known main needle valve described first hereinbefore, has a valve seat and a displaceable valve head, with the valve head in a closed position sealing off the valve seat and thereby blocking the flow of fluid, whereas the valve head in an open position releases the valve seat and thereby also the flow of fluid.

Furthermore, the coating agent valve according to the disclosure has a valve drive in order to displace the valve head between the closed position and the open position. For example, the valve drive may operate pneumatically, with a piston being pressurised in correspondence with the desired valve position.

Further, the coating agent valve according to the disclosure too comprises a displaceable valve needle which connects the valve drive to the valve head and moves the valve head in correspondence with the valve drive. The valve needle therefore transmits the drive movement of the valve drive to a corresponding movement of the valve head.

The disclosure now provides for the valve needle to have a mixer which mixes the coating agent components together. The valve needle in the context of the disclosure is therefore a bifunctional component which firstly transmits the driving force of the valve drive to the valve head and secondly mixes the coating agent components together.

In this case it should be mentioned that the displaceable valve needle may also comprise further components in addition to the mixer in order to transmit the movement of the valve drive to the valve head. It is therefore not necessary in the context of the disclosure for the valve needle to be of one piece and to be formed solely by the mixer.

The mixer may be a static mixer, such as for example a lattice mixer or a spiral mixer. Lattice mixers are known for example from patent application DE 10 2010 019 771 A1 already cited first hereinbefore, so the content of this patent application is to be included in its entirety in the present description. Spiral mixers are likewise known per se from the prior art and are also referred to as Kenics® mixers, so a separate description of such spiral mixers can be dispensed with.

In the case of the coating agent valve according to the disclosure, preferably a hollow paint tube is provided which serves for mounting in a hollow turbine shaft of a rotary atomiser, as is described in German Patent Application DE 10 2010 019 771 A1 already cited first hereinbefore, so the content of this patent application is to be included in its entirety in the present description. The paint tube is then arranged in the mounted state in a turbine shaft of a drive turbine of a rotary atomiser.

In one variant of the disclosure, only a single valve needle which at the same time forms a mixer extends within the paint tube. In another variant of the disclosure, on the other hand, a plurality of valve needles are arranged in the paint tube, each of which needles forms a mixer.

In an example of the disclosure, the coating agent valve has a displaceable thrust piece which is connected at its distal end to the displaceable mixer and displaces it. The displaceable thrust piece therefore acts on the displaceable mixer and forms virtually an extension of the valve needle. Furthermore, the coating agent valve in the example has a valve space in which the thrust piece is displaceably arranged, the valve space being formed cylindrically at least in portions. Further, the coating agent valve according to the disclosure may have a flexible membrane which is fastened centrally in sealing manner to the thrust piece, while the membrane is fastened with its peripheral edge in sealing manner to the inner wall of the valve space. The flexible membrane therefore seals off the annular gap between the displaceable thrust piece on one hand and the inner wall of the valve space. The result of this is that a displacement of the membrane due to a pressure difference between the two sides of the membrane results in axial displacement of the thrust piece and hence also in corresponding displacement of the mixer. Furthermore, this arrangement also results in a displacement of the thrust piece by the valve drive leading to a corresponding axial displacement of the flexible membrane.

Furthermore, it should be mentioned that the coating agent valve according to the disclosure may have two coating agent inlets in order to supply the two coating agent components (e.g. master batch and hardener), the two coating agent inlets open into the valve space on the side of the membrane remote from the valve drive, i.e. on the side of the membrane which faces the mixer. This provides that the membrane seals off the valve drive from the valve space which is filled with coating agent. The membrane therefore prevents the coating agent mixture from being able to penetrate out of the valve space into the valve drive. This is advantageous because the coating agent mixture might otherwise harden in the valve drive, which would lead to component failure.

Furthermore, the sealing by means of the membrane makes it possible to dispense with separate sealing-off of the valve space which is filled with coating agent from the valve drive. The disclosure is however not limited to coating agent valves without such a rubbing seal. Rather, in the context of the disclosure there is also the possibility that in addition to the sealing by the membrane a separate seal is provided which seals off the valve space which is filled with coating agent from the valve drive in order to prevent the coating agent mixture from penetrating into the valve drive.

In the example, the valve drive has a displaceable piston which acts on the valve needle in order to displace the valve needle. Furthermore, the valve drive may have a control-air inlet in order to supply control air, the control air acting on the piston in order to displace the piston and hence also the valve needle. Further, a valve spring may be provided which acts with a spring force on the piston or the valve needle, the spring force of the valve spring in the closed position and in the open position preferably being between 80 N and 100 N.

In this case it should be mentioned that the valve spring presses the valve needle into the closed position, whereas the control air presses the valve needle via the piston preferably in the direction of the open position. The valve spring and the valve head are therefore arranged on opposite sides of the piston.

Furthermore, it should be mentioned that the piston may have a relatively large piston diameter of at least 5 mm, 10 mm, 15 mm, 19 mm or even at least 25 mm in order to generate a large opening force upon movement of the valve needle into the open position. Thus the coating agent valve should be able to open reliably when the valve head is seated securely in the valve seat, for which purpose a sufficiently large opening force is necessary. This sufficiently large opening force is achieved by a correspondingly large piston diameter and a correspondingly large effective piston surface. The large piston surface in turn makes possible operation with a control-air pressure of less than 6 bar, in particular with a control-air pressure of 5.5 bar. This is advantageous because the control air in this manner can be drawn from a conventional 6-bar compressed-air system which is usually available in painting installations anyway, so that a separate control-air supply can be dispensed with.

Furthermore, it should be mentioned that the piston may have a circular cross-section, an oval cross-section of the piston alternatively also being possible.

Further, it should be mentioned that the valve spring presses the valve needle in the direction of the closed position with a certain closing force. The pneumatic valve drive presses the valve needle on the other hand in the event of pneumatic driving in the direction of the open position with a certain opening force. The opening force should in this case be greater by a certain opening force excess than the closing force in order to be able to open the needle valve if the valve head adheres to the valve seat. The abovementioned opening force excess is preferably greater than 20 N, 40 N, 60 N, 80 N, 100 N, 120 N or even greater than 130 N.

Furthermore, the coating agent valve according to the disclosure—as already mentioned—has an automatic reduction in pressure if the coating agent pressure on the input side becomes too great. This prevents damage or operational malfunctions from occurring upstream from the coating agent valve according to the disclosure due to excess pressure. This reduction in pressure is achieved in that the coating agent pressure in the valve space downstream from the membrane acts on the membrane and hence also on the thrust piece, as a result of which the thrust piece and hence also the valve needle is pressed in the direction of the open position. In this case, the force of the valve spring, which presses the valve needle in the direction of the closed position, has to be overcome. The membrane diameter therefore has to be matched to the spring force, corresponding to the desired pressure conditions, so that the coating agent valve opens at the desired opening pressure of the coating agent. The membrane therefore may have a membrane diameter of at least 3 mm, 6 mm or 9 mm and/or at most 40 mm, 20 mm or 11 mm. Furthermore, it should be mentioned that the opening pressure of the coating agent is preferably at least 8 bar, 12 bar or 14 bar and/or at most 22 bar, 18 bar or 16 bar. In the example of embodiment of the disclosure, the coating agent valve on the other hand opens at a coating agent pressure above 15 bar.

It has already been briefly mentioned above that the valve head either seals off or releases the valve seat. In this case it should be mentioned that the valve seat preferably narrows in the direction of flow at a certain seat angle, as the valve head also tapers in the direction of flow at a certain head angle. The seat angle of the valve seat may be substantially identical to the head angle of the valve head. For example, the seat angle and head angle may be in the range from 35°-50°.

In the example, an additional sealing element is inserted into the valve head in order to seal off the valve seat in the closed position. This sealing element consists of a different material than the valve head. For example, the valve head may consist of titanium, whereas the additional sealing element consists of perfluorinated rubber (FFPM). The valve head may therefore consist of a rigid material, whereas the additional sealing element consists of an elastic material, the sealing element being either inserted into the valve head or vulcanised onto the valve head.

For example, the sealing element may be a sealing ring which is inserted into an annular groove in the outer surface of the valve head. In the case of a conical arrangement of the valve head and valve seat, the conical outer surface of the valve head upstream from the sealing element preferably forms an annular circumambient supporting surface which is supported on the sealing seat. In the closed position of the coating agent valve, the valve head therefore lies with its supporting surface against the sealing seat and thereby limits the valve movement in the axial direction. As a result, the compression of the additional sealing element in the annular groove is also limited, which is beneficial for the life of the sealing element.

In this case, however, the problem may occur that coating agent mixture collects in the gap between the valve head and valve seat downstream from the sealing element and hardens there, this region being difficult to flush, since the flushing agent can flow past the sealing element only with difficulty. To solve this problem, axially extending flushing grooves may be provided in the supporting surface of the valve head, through which grooves the flushing agent can pass.

Figure 2:
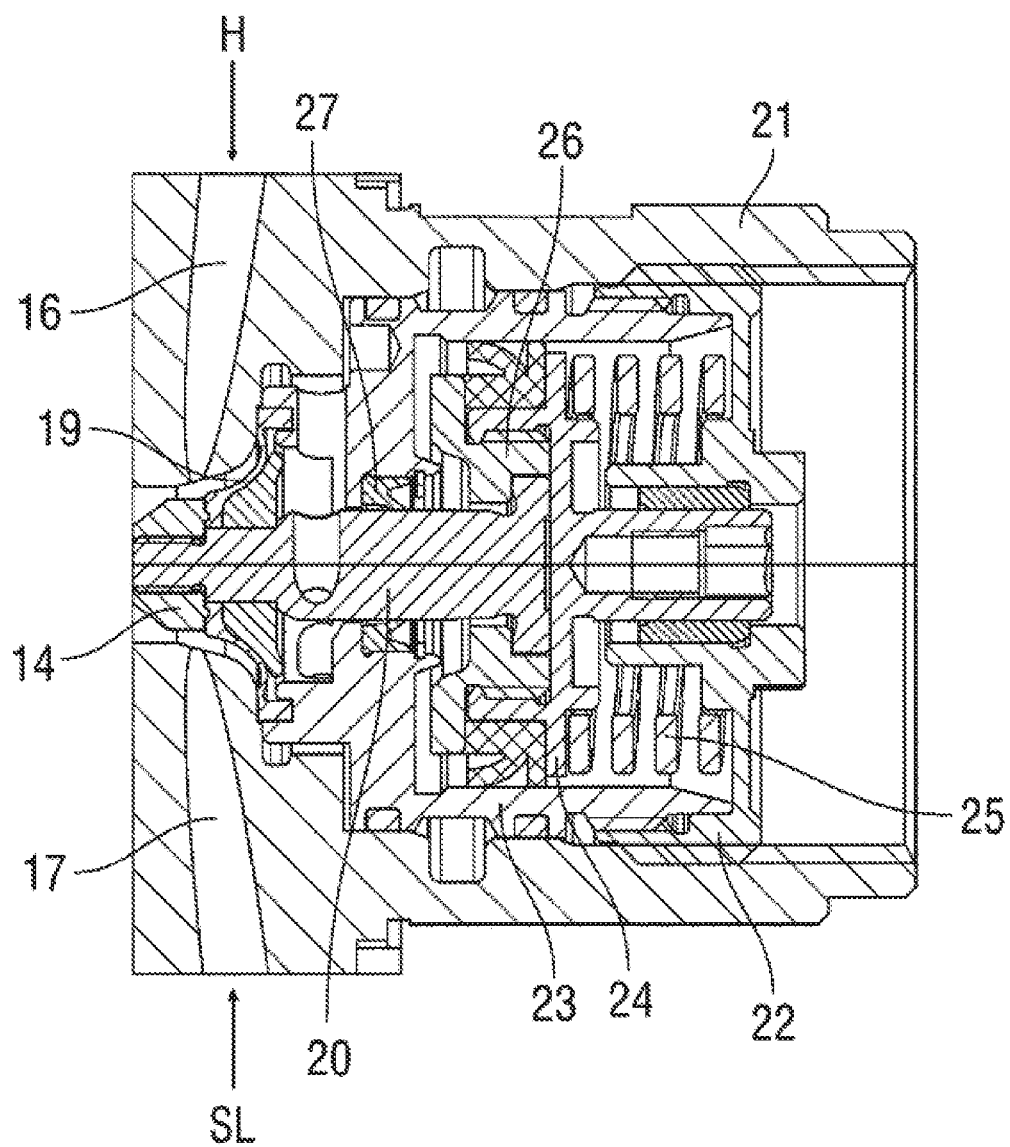
FIG. 2 is an enlargement from FIG. 1 in the region of the valve drive.
Figure 3:
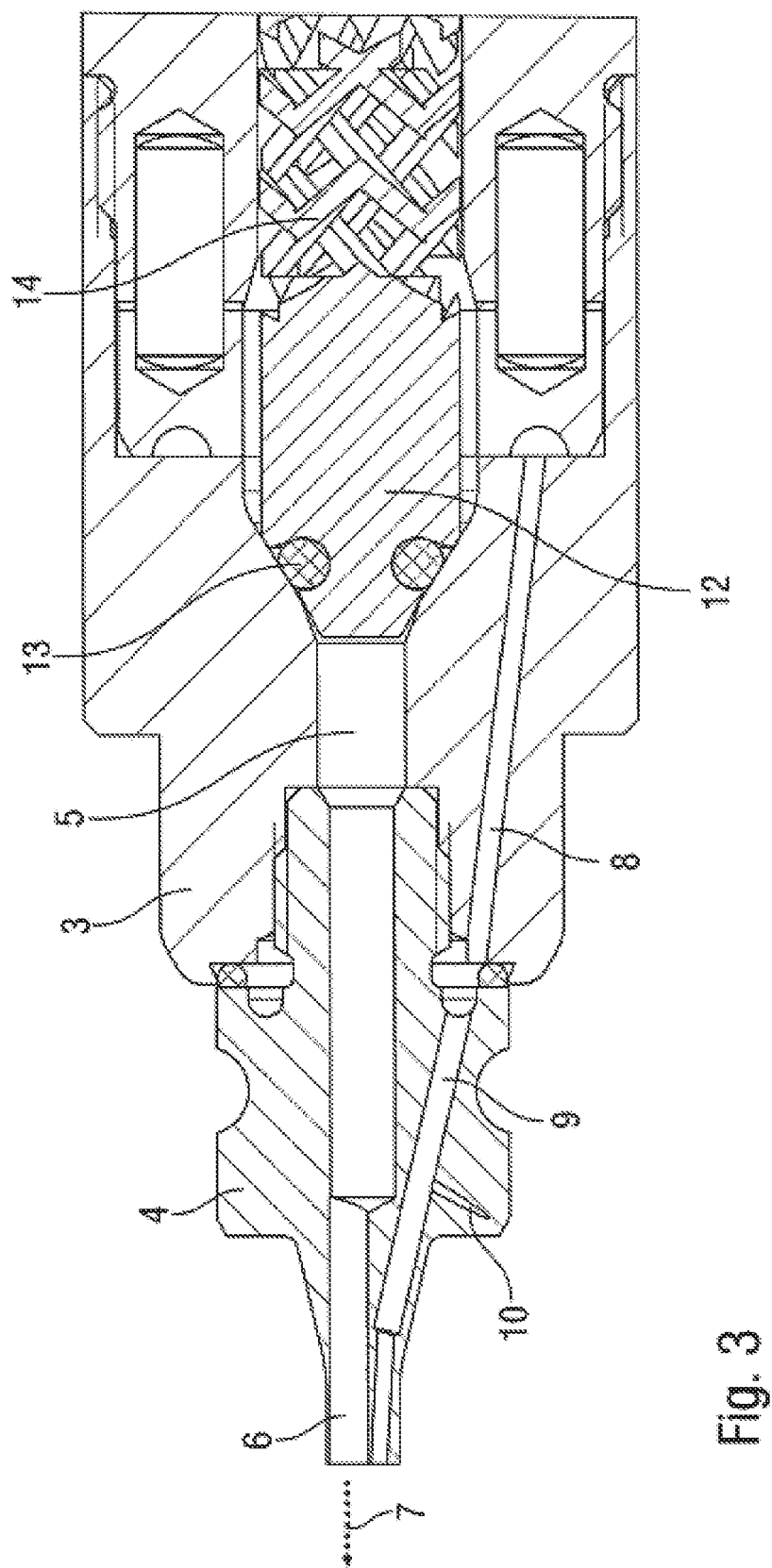
FIG. 3 is an enlargement from FIG. 3 in the region of the paint nozzle.

Further, the disclosure also claims protection for a complete rotary atomiser with such a coating agent valve, which may for example serve as a main needle valve. The details of such a rotary atomiser are known per se to the person skilled in the art and are described for example also in patent application DE 10 2010 019 771 A1 cited first hereinbefore, so the content of this patent application is to be included in its entirety in the present description.

FIGS. 1-5 show various views of a mixer arrangement 1 which can be used in a rotary atomiser in order to mix master batch and hardener together, the mixer arrangement 1 additionally also fulfilling the function of a main needle valve, as will be extensively described later.

With regard to the details of the arrangement of the mixer arrangement in the rotary atomiser, reference is made to patent application DE 10 2010 019 771 A1 already cited first hereinbefore, which describes a rotary atomiser of similar construction.

The mixer arrangement 1 comprises a paint tube 2 with a screwed-on head part 3 and a paint nozzle 4 screwed into the head part 3.

The paint nozzle 4 is described in detail in U.S. Pat. No. 9,126,217, so that the content of this patent application is incorporated by reference.

In the head part 3 of the paint tube 2 there extends a paint duct 5 which is continued in a paint duct 6 in the paint nozzle 4. Upon the application of paint, therefore a coating agent jet 7 emerges out of the paint duct 6 of the paint nozzle 4.

Furthermore, it should be mentioned that a flushing agent duct 8 extends in the head part 3 of the paint tube 2, which duct feeds a flushing agent duct 9 in the paint nozzle 4. From the flushing agent duct 9 in the paint nozzle 4 there branches off a flushing agent duct 10, as is described extensively in U.S. Pat. No. 9,126,217.

In the head part 3 of the paint tube 2 there is a valve seat 11, which narrows conically in the direction of flow at a seat angle $\beta$, and is illustrated schematically in FIG. 5.

Furthermore, the mixer arrangement 1 comprises a valve head 12 which is displaceable in the direction of the double arrow and tapers conically at its distal end at a head angle $\alpha$. A sealing ring 13 is set into the conical outer surface of the valve head 12 in order to seal off the valve seat 11 in a closed position, as will be described in detail later.

Furthermore, the mixer arrangement 1 contains a lattice mixer 14 which is arranged in the paint tube 2 and is displaceable in the direction of the arrow. At its distal end, the lattice mixer 14 is connected to the valve head 12. At its proximal end, the lattice mixer 14 on the other hand is connected to a valve drive 15. The valve drive 15 therefore acts on the displaceable lattice mixer 14, which is connected to the valve head 12, so that the lattice mixer 14 also takes on the function of a valve needle.

Furthermore, the mixer arrangement 1 comprises a hardener feed line 16 for supplying a hardener H, and a master batch feed line 17 for feeding a master batch SL. The hardener feed line 16 and the master batch feed line 17 in this case open into a valve space 18 downstream from a membrane 19, the membrane 19 sealing off the valve space 18 from the valve drive 15, as will be described in detail later. The hardener H and the master batch SL then flow out of the valve space 18 through the lattice mixer 14 and are mixed together there.

It can be seen from the detail representation of the valve drive 15 in FIG. 2 that the valve drive 15 has a thrust piece 20 which is connected at its distal end to the lattice mixer 14 and thus displaces the lattice mixer 14.

Furthermore, the valve drive 15 comprises a housing body 21 with an outer housing insert 22 and an inner housing insert 23. In the inner housing insert 23 there is displaceably arranged a valve piston 24, with a valve spring 25 being supported on one hand on the outer housing insert 22 and on the other hand on the valve piston 24. The valve spring 25 therefore presses the valve piston 24 in the drawings of FIGS. 1 and 2 towards the left, i.e. into a closed position. The movement of the valve piston 24 acts via the thrust piece 20 and the lattice mixer 14 on the valve head 12, which either releases or closes the valve seat 11.

The thrust piece 20 in this case is connected to the valve piston 24 via a piston insert 26. Furthermore, the thrust piece 20 in this case surrounds an additional sealing ring 27.

Furthermore, it should be mentioned that the valve piston 24 on the left-hand side in FIGS. 1 and 2 can be acted upon by control air, which is supplied via a control-air inlet (not shown). Upon corresponding pressurisation by the control air, the control air therefore presses the valve piston 24 in the drawings of FIGS. 1 and 2 towards the right, i.e. into an open position.

The valve spring 25 therefore presses the valve head 12 via the thrust piece 20 and the lattice mixer 14 into the closed position in order to close the coating agent valve. The control air acting on the valve piston 24 presses the valve head 12, on the other hand, into the open position via the thrust piece 20 and the lattice mixer 14.

In this case, it should be emphasised once again that the lattice mixer 14 has two functions. Firstly, the lattice mixer 14 mixes the hardener H with the master batch SL. Furthermore, the lattice mixer 14 in this case however also serves as a valve needle and transmits the drive movement of the valve drive 15 to the valve head 12. This reduces the space required for the valve needle and the lattice mixer 14, since both functions are combined in one component. As a result, a plurality of lattice mixers 14 can be arranged in the paint tube. Alternatively, there is the possibility of a paint tube 2 with a smaller cross-section being used.

Figure 5:
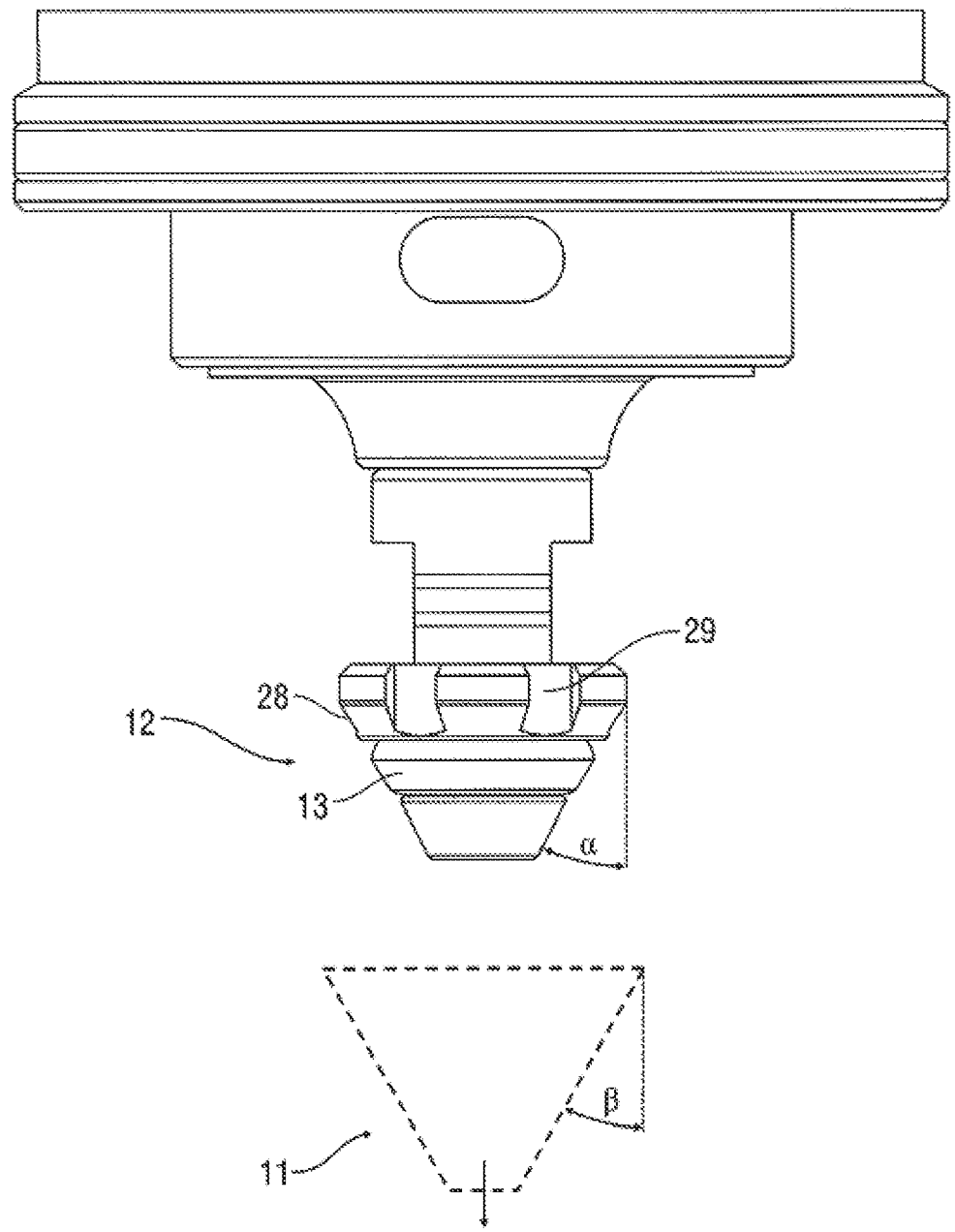
FIG. 5 is an illustration of the valve head and valve seat.

It can furthermore be seen from FIG. 5 that the sealing ring 13 in the valve head 12 is inserted into an annular groove in the valve head 12. The conical outer surface 28 of the valve head 12 upstream from the sealing ring 13 in this case forms a rigid supporting surface which in the closed position of the valve head 12 lies against the conical inner wall of the valve seat 11 and thereby limits the compression of the sealing ring 13, which is beneficial for the life of the sealing ring 13.

Further, FIG. 5 shows that the valve head 12 has axially extending flushing grooves 29 in the conical outer surface 28 (supporting surface), through which grooves in the closed state of the valve flushing agent can flow, in order to flush the region downstream from the sealing ring 13.

FIG. 6 shows a modification of a spiral mixer 14' instead of the lattice mixer 14, such spiral mixers 14' also being known as Kenics® mixers and therefore not needing to be described further.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A coating agent valve for controlling a flow of fluid of a coating agent mixture consisting of two coating agent components master batch, with:
   a) a valve seat,
   b) a displaceable valve head,
      b1) wherein the valve head in a closed position seals off the valve seat and thereby blocks the flow of fluid,
      b2) whereas the valve head in an open position releases the valve seat and thereby also the flow of fluid,
   c) a valve drive for displacing the valve head, the valve drive including a displaceable piston which acts on the valve needle in order to displace the valve needle, a control-air inlet for supplying control air, the control air acting on the piston in order to displace the piston and hence also the valve needle, and a valve spring which acts with a spring force on the piston or the valve needle, wherein the valve spring presses the valve needle in the direction of the closed position, and the control air presses the valve needle via the piston in the direction of the open position, the valve spring and the valve head are arranged on opposite sides of the piston, the piston has a piston diameter of at least 5 mm, in order to generate a large opening force upon movement of the valve needle into the open position, the control air for moving the valve needle into the open position requires a control-air pressure of less than 6 bar, so that the control air can be drawn from a conventional 6-bar compressed-air system, and the piston including an oval cross section,
   d) a displaceable valve needle which connects the valve drive to the valve head and moves the valve head in correspondence with the valve drive,
   e) a flexible membrane which is fastened in a valve space, a displacement of the membrane resulting in a corresponding displacement of the valve needle,
   f) a first coating agent inlet for supplying the first coating agent component, and
   g) a second coating agent inlet for supplying the second coating agent component,
   h) wherein the first coating agent inlet and the second coating agent inlet opens into the valve space on the side of the membrane remote from the valve drive, and
   i) the coating agent pressure in the valve space downstream from the membrane from a certain opening pressure onwards presses the valve needle via the membrane out of the closed position into the open position.

2. A coating agent valve according to claim 1, wherein the valve needle is formed at least in part by a mixer which mixes the coating agent components together.

3. A coating agent valve according to claim 2, wherein the mixer is a static mixer.

4. A coating agent valve according to claim 3, wherein the static mixer is a lattice mixer.

5. A coating agent valve according to claim 3, wherein the static mixer is a spiral mixer.

6. A coating agent valve according to claim 2, wherein the coating agent valve has a hollow paint tube for mounting in a hollow turbine shaft of a rotary atomiser, the paint tube and the turbine shaft in the mounted state extending coaxially.

7. A coating agent valve according to claim 6, wherein the valve needle is arranged in the paint tube in the form of the mixer.

8. A coating agent valve according to claim 1, wherein
   a) the coating agent valve has a displaceable thrust piece which is connected at its distal end to the displaceable mixer and displaces it,
   b) the thrust piece is arranged displaceably, and
   c) the membrane is fastened centrally in sealing manner on the thrust piece, whereas the membrane is fastened with its peripheral edge in sealing manner on the inner wall of the valve space.

9. A coating agent valve according to claim 8, wherein
   a) the first coating agent inlet opens into the valve space on the side of the membrane remote from the valve drive, so that the membrane seals off the valve drive from the mixer, and
   b) the second coating agent inlet opens into the valve space on the side of the membrane remote from the valve drive, so that the membrane seals off the valve drive from the mixer.

10. A coating agent valve according to claim 1, wherein the spring force of the valve spring in the closed position and in the open position being at least 20 N and at most 400 N.

11. A coating agent valve according to claim 1, wherein
    a) the valve spring presses the valve needle in the direction of the closed position with a certain closing force, b) the pneumatic valve drive in the event of pneumatic driving presses the valve needle with a certain opening force in the direction of the open position,
c) the opening force is greater by a certain opening force excess than the closing force, in order to be able to open the coating agent valve if the valve head adheres to the valve seat.

12. A coating agent valve according to claim 11, wherein the opening force excess is greater than 20 N.

13. A coating agent valve according to claim 1, wherein
a) the membrane has a membrane diameter of at least 3 mm and at most 40 mm, and
b) the opening pressure of the coating agent is at least 8 bar and at most 22 bar.

14. A coating agent valve according to claim 1, wherein
a) the valve seat narrows in the direction of flow at a certain seat angle,
b) the valve head narrows in the direction of flow at a certain head angle,
c) the seat angle is substantially identical to the head angle.

15. A coating agent valve according to claim 14, wherein
a) the seat angle is greater than 20° and less than 70°, and
b) the head angle is greater than 20° and less than 70°.

16. A coating agent valve according to claim 1, wherein the valve head includes a sealing element is inserted into the valve head of the valve needle in order to seal off the valve seat in the closed position.

17. A coating agent valve according to claim 16, wherein the sealing element is a sealing ring which is inserted into an annular groove in the valve head.

18. A coating agent valve according to claim 1, wherein the valve needle is formed at least in part by a mixer which mixes the coating agent components together.

19. A coating agent valve according to claim 18, wherein the coating agent valve has a hollow paint tube for mounting in a hollow turbine shaft of a rotary atomiser, the paint tube and the turbine shaft in the mounted state extending coaxially.

20. A coating agent valve according to claim 19, wherein the valve needle is arranged in the paint tube in the form of the mixer.

21. A coating agent valve for controlling a flow of fluid of a coating agent mixture consisting of two coating agent components master batch, with:
a) a valve seat,
b) a displaceable valve head,
  b1) wherein the valve head in a closed position seals off the valve seat and thereby blocks the flow of fluid,
  b2) whereas the valve head in an open position releases the valve seat and thereby also the flow of fluid,
c) a valve drive for displacing the valve head,
d) a displaceable valve needle which connects the valve drive to the valve head and moves the valve head in correspondence with the valve drive,
e) a flexible membrane which is fastened in a valve space, a displacement of the membrane resulting in a corresponding displacement of the valve needle,
f) a first coating agent inlet for supplying the first coating agent component,
g) a second coating agent inlet for supplying the second coating agent component,
h) wherein the first coating agent inlet and the second coating agent inlet opens into the valve space on the side of the membrane remote from the valve drive,
i) the coating agent pressure in the valve space downstream from the membrane from a certain opening pressure onwards presses the valve needle via the membrane out of the closed position into the open position,
j) wherein a sealing element is inserted into the valve head of the valve needle in order to seal off the valve seat in the closed position,
k) wherein the sealing element consists of a different material than the valve head of the valve needle,
l) wherein the sealing element consists of perfluorinated rubber, and
m) wherein the valve head consists of titanium.

22. A coating agent valve according to claim 21, wherein the valve needle is formed at least in part by a mixer which mixes the coating agent components together.

23. A coating agent valve according to claim 22, wherein the mixer is a static mixer.

24. A coating agent valve according to claim 23, wherein the static mixer is a lattice mixer.

25. A coating agent valve according to claim 21, further comprising a valve spring which acts with a spring force, the spring force of the valve spring in the closed position and in the open position being at least 20 N and at most 400 N.

26. A coating agent valve according to claim 21, wherein the valve needle is formed at least in part by a mixer which mixes the coating agent components together.

27. A coating agent valve for controlling a flow of fluid of a coating agent mixture consisting of two coating agent components master batch, with:
a) a valve seat,
b) a displaceable valve head,
  b1) wherein the valve head in a closed position seals off the valve seat and thereby blocks the flow of fluid,
  b2) whereas the valve head in an open position releases the valve seat and thereby also the flow of fluid,
c) a valve drive for displacing the valve head,
d) a displaceable valve needle which connects the valve drive to the valve head and moves the valve head in correspondence with the valve drive,
e) a flexible membrane which is fastened in a valve space, a displacement of the membrane resulting in a corresponding displacement of the valve needle,
f) a first coating agent inlet for supplying the first coating agent component,
g) a second coating agent inlet for supplying the second coating agent component,
h) wherein the first coating agent inlet and the second coating agent inlet opens into the valve space on the side of the membrane remote from the valve drive,
i) the coating agent pressure in the valve space downstream from the membrane from a certain opening pressure onwards presses the valve needle via the membrane out of the closed position into the open position,
j) wherein the valve head includes a sealing element is inserted into the valve head of the valve needle in order to seal off the valve seat in the closed position,
k) wherein the valve head tapers substantially conically in the direction of flow,
l) wherein the valve seat tapers substantially conically in the direction of flow,
m) wherein the valve head has an annular groove in its conical casing surface into which the sealing element is inserted,
n) wherein the conical casing surface of the valve head upstream from the sealing element forms an annular circumambient supporting surface and is supported with the supporting surface on the valve seat, and o) wherein the valve head has at least one axially extending flushing groove in the supporting surface, which groove in the closed position of the valve needle allows flushing agent to be passed through out of the valve space towards the sealing element.

28. A coating agent valve according to claim 27, wherein the sealing element consists of a different material than the valve head of the valve needle.

29. A coating agent valve according to claim 28, wherein the sealing element consists of perfluorinated rubber.

30. A coating agent valve according to claim 27, wherein the sealing element consists of an elastic material.

31. A coating agent valve according to claim 30, wherein the sealing element is vulcanised onto the valve head.

32. A coating agent valve according to claim 27, wherein the flushing groove has a groove width of at least 1 mm and at most 2 mm.

33. A coating agent valve according to claim 27, wherein
a) the valve head has a rigid stop and in the closed position is supported with the stop on the valve seat, and
b) the sealing element in the valve head in the closed position of the valve needle is exposed to a pressure which is independent of the closing force acting on the valve needle, since the valve head is supported with its rigid stop on the valve seat.

34. A coating agent valve according to claim 27, further comprising a valve spring which acts with a spring force, the spring force of the valve spring in the closed position and in the open position being at least 20 N and at most 400 N.

35. A coating agent valve according to claim 34, wherein the coating agent valve has a hollow paint tube for mounting in a hollow turbine shaft of a rotary atomiser, the paint tube and the turbine shaft in the mounted state extending coaxially.

36. A coating agent valve according to claim 35, wherein the valve needle is arranged in the paint tube in the form of the mixer.

37. A coating agent valve according to claim 27, wherein the mixer is a static mixer.

38. A coating agent valve according to claim 37, wherein the static mixer is a lattice mixer.

39. A coating agent valve according to claim 37, wherein the coating agent valve has a hollow paint tube for mounting in a hollow turbine shaft of a rotary atomiser, the paint tube and the turbine shaft in the mounted state extending coaxially.

40. A coating agent valve according to claim 39, wherein the valve needle is arranged in the paint tube in the form of the mixer.

* * * * *